United States Patent [19]

Schleeter

[11] Patent Number: 5,339,478
[45] Date of Patent: Aug. 23, 1994

[54] ROLLOVER CAR WASH WITH RETRACTING CLOTH STRIPS

[76] Inventor: Keith M. Schleeter, 7301 Old Shakopee Rd. W., Bloomington, Minn. 55438

[21] Appl. No.: 54,748

[22] Filed: Apr. 27, 1993

[51] Int. Cl.5 ............................................. B60S 3/04
[52] U.S. Cl. ........................... 15/97.3; 15/DIG. 2
[58] Field of Search ............... 15/97.3, DIG. 2; 134/6

[56] References Cited

U.S. PATENT DOCUMENTS

| 4,453,284 | 6/1984 | Schleeter | 15/97 |
| 4,462,133 | 9/1984 | Hanna | 15/97.3 |
| 4,756,040 | 7/1988 | Sereny | 15/97.3 |

FOREIGN PATENT DOCUMENTS

| 0151155 | 8/1985 | Japan | 15/97.3 |
| 2224706 | 5/1990 | United Kingdom | 15/97.3 |

Primary Examiner—Edward L. Roberts
Attorney, Agent, or Firm—Palmatier, Sjoquist & Helget

[57] ABSTRACT

A rollover car wash with arrays of cloth curtains to wash the car. Air cylinders to oscillate the curtains, and controls to swing both arrays of cloth curtains out to the sides of the car when washing is complete.

2 Claims, 1 Drawing Sheet

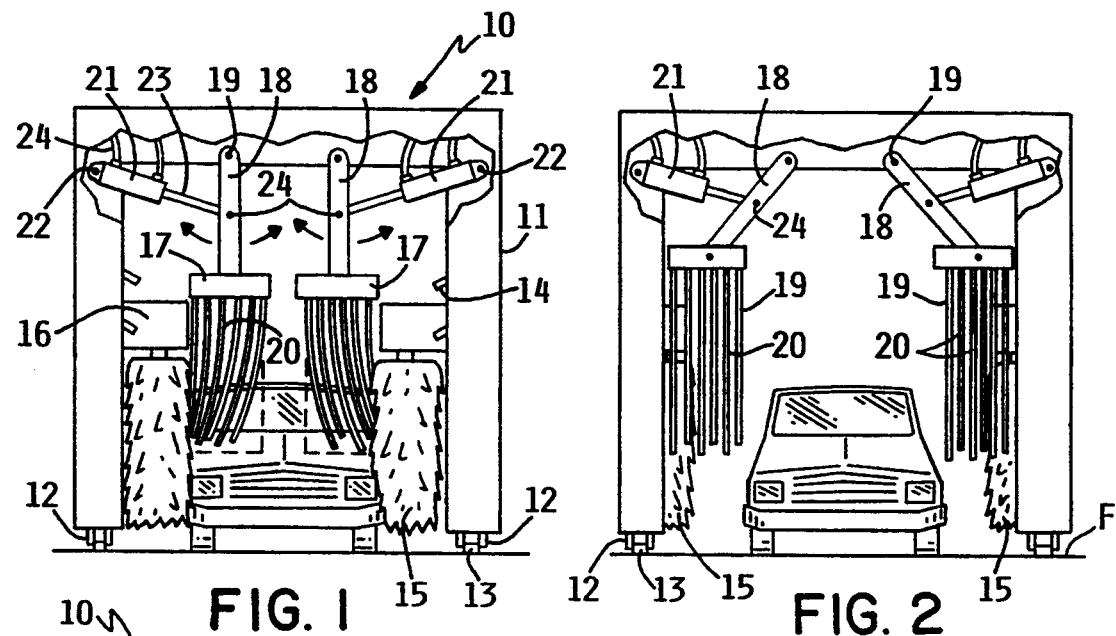
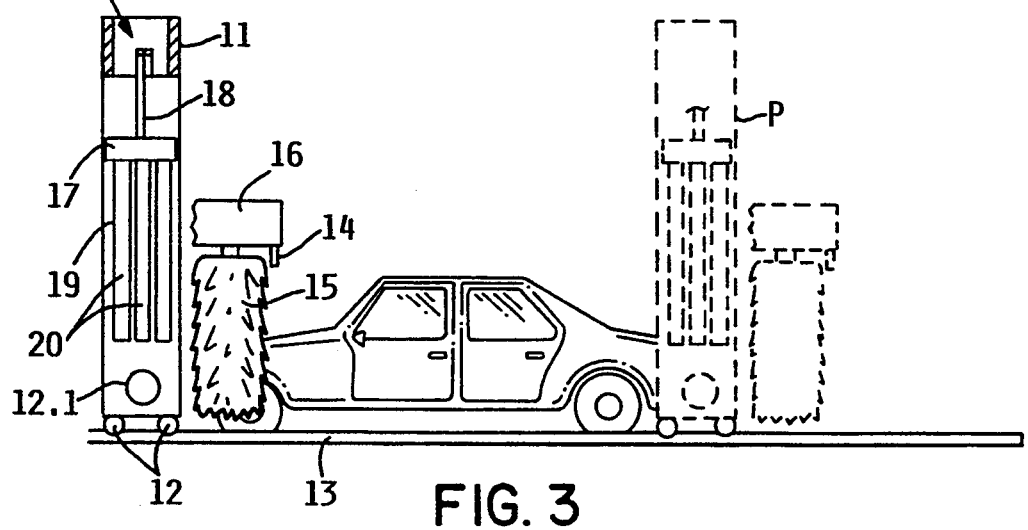
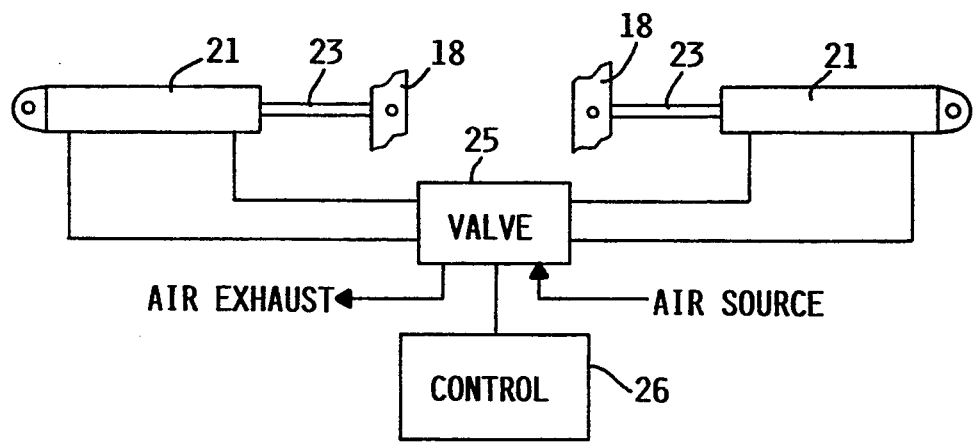
FIG. 4

ROLLOVER CAR WASH WITH RETRACTING CLOTH STRIPS

BACKGROUND OF THE INVENTION

This invention relates to a rollover car wash, and more particularly to a rollover car wash utilizing cloth strips which hang from the arch frame and are oscillated across the automobile during washing.

This type of car washing equipment is oftentimes used in a small room of a gasoline station where the owner of the automobile simply drives his automobile into the room and the car is washed, and then while the car is still wet, the car will be driven forwardly out of the room. Most car washes are arranged so that the hanging arrays of cloth strips are located at the front of the room and adjacent the front of the automobile as it is initially placed in washing position. The arch which suspends the racks which carry the cloth strips allows the racks and the strips to be oscillated transversely across the car as the car is washed, and the arch will progressively travel longitudinally along the car to a position adjacent the rear end of the car and then the arch will change directions and move forwardly to its original position adjacent the front of the car. With the arrays of cloth strips hanging across the front of the car and adjacent the hood, the driver of the car has a very difficult time seeing forwardly so that he can safely proceed through the hanging arrays of cloth strips and out the door adjacent the front of the car.

SUMMARY OF THE INVENTION

An object of the invention is to provide a rollover car wash which may be conveniently operated by the owner of an automobile, such that when the washing is completed, the operator of the automobile may simply drive forwardly safely with full vision of the driveway in front of him.

A feature of the invention is the apparatus for operating the racks suspending the cloth strips and causing the racks to oscillate transversely across the car to produce the washing and subsequently swinging the racks to the sides of the car so that the cloth strips are cleared away from the windshield, allowing the driver to drive forwardly out of the washing area.

Another feature of the invention is the method of washing a parked car wherein a pair of arrays of downwardly hanging cloth strips are oscillated in directions transversely of the car and transversely of the side portions of the car and transversely across the hood and the top of the car body for washing the car, moving the oscillating arrays of cloth strips from a first position adjacent the front portion of the car and in a rearward direction longitudinally along the car to a second position adjacent the rear of the car, and then returning the arrays of cloth strips to the first position adjacent the front of the car, discontinuing the oscillating of the arrays when the arrays are returned to said first position, and moving individual arrays of said pair of arrays in opposite transverse directions away from the windshield and side portions of the car to permit clear vision forwardly through the windshield as the car is driven forwardly away from said arrays.

BRIEF DESCRIPTION OF THE DRAWINGS

FIG. 1 is a front elevation view of the rollover car wash as shown in the first position with the arrays of cloth strips adjacent the front portion of the car.

FIG. 2 is another elevation view of the car washing equipment in the final position where the arrays of cloth strips and their suspending racks have been drawn to the sides of the car as to clear the windshield of the car.

FIG. 3 is a side elevation view, showing the washing arch in section and illustrating the movement of the washing arch rearwardly along the car to a second position adjacent the rear portion of the car.

FIG. 4 is a diagrammatic sketch of the control apparatus of the oscillating mechanism for the arrays of cloth strips.

DETAILED SPECIFICATION

One form of the invention is illustrated and described herein and is indicated in general by the numeral 10. The washing apparatus 10 includes a mobile arch 11 of rigid frame construction and having wheels 12 on the bottom of the arch to roll along a track 13 which is placed on the floor "F" of the room in which the car wash equipment 10 is located. The arch 11 is connected to sources of water to supply water to nozzles 14 as to direct water and cleaning fluid toward the cars and toward the brushes 15 which are also suspended on a swingable appendage portion 16 of the arch 11 so that the brushes may be used to wash and rinse the sides of the car and the front and rear bumpers and adjacent portions of the body.

A pair of racks 17 have upstanding mounting arms 18 affixed thereto and swingably mounted on the arch frame 11 by pivot pins 19. Each of the racks 17 suspends an array 19 of cloth strips 20 which are made of any of a number of materials such as a felt-like fabric. When the strips are stationary, they will hang straight down as indicated by the dotted lines in FIG. 1. When oscillating, the strips swing to and fro, out and back, as suggested by the full line positions of strips 70 in FIG. 1.

Operating means are provided for producing swinging and oscillating of the racks 17 and cloth strips 19, and in the form illustrated, air cylinders 21 are pivotally mounted on the arch 17 by pins 22, and the rods 23 of air cylinders 21 are pivotally connected to the mounting arms 18 by pivots 24. Each of the air cylinders has a pair of air tubes 24 connected to opposite ends of the cylinder, and the air tubes are connected to a suitable source of supply and a control valve 25, as is illustrated in FIG. 4.

The valve 25 is alternately operated by a control mechanism 26 as to apply air under pressure alternately to opposite ends of each of the cylinders 21. The control also causes the valve 25 to operate, when the washing cycle is completed, to direct air to the two cylinders 21 so that both of the piston rods 23 thereof are simultaneously retracted, as illustrated in FIG. 2, for the purpose of moving the individual arrays 20 of cloth strips in opposite transverse directions away from the windshield and side portions of the car to permit clear vision forwardly through the windshield of the car as the car is driven away from the arrays and from the arch 11.

During the washing cycle, the two cylinders 21 are oppositely operated as to extend the piston rod of one while the other cylinder retracts its piston rod, thereby swinging the racks 17 and the arrays 19 in unison. This causes the cloth strips 20 to swing transversely against the side portions of the car or automobile and transversely across the hood and top of the body of the car. This oscillation occurs as the arch 11 progressively travels on its wheels along the track 13 longitudinally along the car, as from the first position illustrated in full lines in FIG. 3 to the dotted line position "P" thereof adjacent the rear of the automobile, whereupon the wheels of the arch 11 will reverse under influence of hydraulic motor 12.1 and its controls as to return the arch to its first position adjacent the front portion of the automobile, whereupon when the arch 11 stops in its first position, the cylinders 21 both retract their piston rod under influence of the valve operating control 26 so that all of the cloth strips 20 will swing out of the way of the windshield of the car as illustrated in FIG. 2. The operator of the car will then simply drive his automobile forward away from the arch and he will be able to see the driveway in front of him for safe operation.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A rollover car wash machine for cleaning a stationary automotive vehicle, comprising a mobile arch frame to travel along the stationary automobile, a washing apparatus carried by the arch frame and comprising a pair of side-by-side arrays of oscillating cloth strips to scrub the vehicle body, and cloth strip operating means oscillating the cloth strips across the automobile body during washing and swinging the cloth strips to the sides of the arch at the completion of a washing cycle, and said operating means comprising a pair of air cylinders each connected to one of said arrays of side-by-side arrays and first oscillating said one array during washing and then when the washing is completed moving said one array away from the other of the side-by-side arrays and toward the side of the arch frame and away from the windshield of the automobile.

2. A rollover car wash machine for cleaning a stationary automotive vehicles, comprising a mobile arch frame movable along the stationary vehicle from end to end of the vehicle, washing apparatus on the arch frame and including a pair of side-by-side suspending racks comprising cloth strips hanging therefrom, said suspending racks comprising upright hanger portions swingably mounted on the arch frame to direct the swinging of the suspension racks and cloth strips from side to side toward the sides of the arch frame, and operating means producing swinging of said suspension racks during a washing cycle and swinging the suspension racks in opposite directions and respectively toward the sides of the arch frame at the completion of a washing cycle to remove the hanging cloth strips away from the stationary automobile and from the automobile windshield, said operating means producing swinging of the suspension racks include air cylinders connected to the racks and operating the racks to oscillate the cloth strips and to swing the strips transversely out of the way at the completion of a washing cycle.

* * * * *